United States Patent
Kuroda et al.

(10) Patent No.: US 11,322,982 B2
(45) Date of Patent: May 3, 2022

(54) COIL MEMBER, CONTACTLESS-TYPE POWER TRANSMISSION DEVICE, ELECTROMAGNETIC WAVE IRRADIATION/RECEPTION DEVICE, POWER TRANSMISSION/INFORMATION COMMUNICATION DEVICE, AND AUTONOMOUS MOBILE ROBOT SYSTEM

(71) Applicant: JAPAN AVIATION ELECTRONICS INDUSTRY, LIMITED, Tokyo (JP)

(72) Inventors: Hidehiko Kuroda, Tokyo (JP); Etsuo Matsumoto, Tokyo (JP); Shigeru Kobayashi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 17/051,840

(22) PCT Filed: Apr. 15, 2019

(86) PCT No.: PCT/JP2019/016115
§ 371 (c)(1),
(2) Date: Oct. 30, 2020

(87) PCT Pub. No.: WO2019/225209
PCT Pub. Date: Nov. 28, 2019

(65) Prior Publication Data
US 2021/0328460 A1 Oct. 21, 2021

(30) Foreign Application Priority Data
May 24, 2018 (JP) .............................. JP2018-099548

(51) Int. Cl.
*H02J 50/10* (2016.01)
*B60L 53/122* (2019.01)
(Continued)

(52) U.S. Cl.
CPC ............ *H02J 50/10* (2016.02); *B60L 53/122* (2019.02); *G05D 1/0088* (2013.01); *H01F 27/2823* (2013.01)

(58) Field of Classification Search
CPC ....... H02J 50/10; H02J 50/12; H01F 27/2823; H01F 2027/2809; B60L 53/122; G05D 1/0088
See application file for complete search history.

(56) References Cited

U.S. PATENT DOCUMENTS

| 4,939,400 A | 7/1990 | Matsushita et al. |
| 8,487,486 B1 | 7/2013 | Vann |
| (Continued) | | |

FOREIGN PATENT DOCUMENTS

| CN | 1938921 A | 3/2007 |
| CN | 104518576 A | 4/2015 |
| (Continued) | | |

OTHER PUBLICATIONS

International Search Report of PCT/JP2019/016115, dated May 21, 2019.
(Continued)

*Primary Examiner* — Lincoln D Donovan
*Assistant Examiner* — Alex W Lam
(74) *Attorney, Agent, or Firm* — Collard & Roe, P.C.

(57) ABSTRACT

A first disclosure is a coil member wherein a lead wire is wound in oval shape, with an oval-shaped cross section being curved along a major-axis direction of the oval-shaped cross section and having a curvature axis in a direction parallel to a minor-axis direction of the oval-shaped cross section. A second disclosure is a contactless-type power transmission device provided with: a coil member as a first coil; a second coil; and a tilting shaft that makes variable, using the curvature axis as a rotating axis, an inclination (Continued)

between a central axis of the first coil, which is a rotational symmetry axis of the first coil, and a central axis of the second coil.

12 Claims, 12 Drawing Sheets

(51) Int. Cl.
  *H01F 27/28* (2006.01)
  *G05D 1/00* (2006.01)

(56) References Cited

U.S. PATENT DOCUMENTS

| 9,544,480 | B2 | 1/2017 | Katoh et al. | |
|---|---|---|---|---|
| 9,698,605 | B2 | 7/2017 | Kanagawa et al. | |
| 10,033,229 | B2 | 7/2018 | Kanagawa et al. | |
| 2007/0032697 | A1 | 2/2007 | Shimizu et al. | |
| 2008/0236629 | A1* | 10/2008 | Sugawara | B08B 9/00 134/22.11 |
| 2011/0254380 | A1 | 10/2011 | Shimizu et al. | |
| 2015/0015082 | A1 | 1/2015 | Kanagawa et al. | |
| 2015/0097444 | A1 | 4/2015 | Kamiura et al. | |
| 2015/0222129 | A1 | 8/2015 | McCauley et al. | |
| 2015/0249360 | A1 | 9/2015 | Ichikawa | |
| 2016/0127643 | A1* | 5/2016 | Huerta | H01R 35/04 348/211.2 |
| 2016/0141097 | A1 | 5/2016 | Oo et al. | |
| 2018/0102211 | A1* | 4/2018 | Hanabusa | H01F 38/14 |
| 2018/0248417 | A1 | 8/2018 | Ichikawa | |
| 2019/0081496 | A1 | 3/2019 | Itagaki et al. | |

FOREIGN PATENT DOCUMENTS

| CN | 104604077 A | 5/2015 |
|---|---|---|
| CN | 105720403 A | 6/2016 |
| CN | 105758381 A | 7/2016 |
| CN | 107887148 A | 4/2018 |
| CN | 107919733 A | 4/2018 |
| CN | 107925250 A | 4/2018 |
| JP | H01-212131 A | 8/1989 |
| JP | H01-308014 A | 12/1989 |
| JP | 2004-166459 A | 6/2004 |
| JP | 2011-072115 A | 4/2011 |
| JP | 2013-197224 A | 9/2013 |
| JP | 2014-087125 A | 5/2014 |
| JP | 2015-019547 A | 1/2015 |
| JP | 2015-061230 A | 3/2015 |
| JP | 2015-220801 A | 12/2015 |
| JP | 2016-099856 A | 5/2016 |
| WO | 2017/145266 A1 | 8/2017 |

OTHER PUBLICATIONS

Extended European Search Report in EP 19807842.0 dated Jun. 7, 2021.
Chinese Office Action in 201980030834.8, dated Oct. 9, 2021.
Chinese Office Action in 201980030834.8, dated Feb. 14, 2022.

* cited by examiner

FRONT VIEW (WITHOUT TILT)

FRONT VIEW (WITH TILT)

PLAN VIEW

RIGHT SIDE VIEW

COIL END OF CIRCU-
LAR-ARC SHAPE
→SHORT DISTANCE
  BETWEEN COILS
→WIDE RANGE OF
  INCREASE IN COUPLING
  COEFFICIENT k

COIL END OF
SQUARE SHAPE
→MEDIUM DISTANCE
  BETWEEN COILS
→MEDIUM RANGE OF
  INCREASE IN COUPLING
  COEFFICIENT k

COIL END OF
BULGED SHAPE
→LONG DISTANCE
  BETWEEN COILS
→SMALL RANGE OF
  INCREASE IN COUPLING
  COEFFICIENT k

FRONT VIEW (WITHOUT TILT)

FRONT VIEW (WITH TILT)

PLAN VIEW

RIGHT SIDE VIEW

COIL MEMBER, CONTACTLESS-TYPE POWER TRANSMISSION DEVICE, ELECTROMAGNETIC WAVE IRRADIATION/RECEPTION DEVICE, POWER TRANSMISSION/INFORMATION COMMUNICATION DEVICE, AND AUTONOMOUS MOBILE ROBOT SYSTEM

CROSS REFERENCE TO RELATED APPLICATIONS

This application is the National Stage of PCT/JP2019/016115 filed on Apr. 15, 2019, which claims priority under 35 U.S.C. § 119 of Japanese Application No. 2018-099548 filed on May 24, 2018, the disclosure of which is incorporated by reference. The international application under PCT article 21(2) was not published in English.

TECHNICAL FIELD

The present invention relates to a technique for power transmission between a plurality of machinery portions accompanied with a tilting operation.

BACKGROUND ART

Between a plurality of machinery portions accompanied with a tilting operation, power transmission may be carried out. Herein, a conventional "contact-type" power transmission device includes a set of "contact-type" electrodes which are rotatable around a tilting shaft. Accordingly, there arises bad continuity due to electrode abrasion, mechanical vibration, and bending fatigue and a need for maintenance work. On the other hand, a conventional "contactless-type" power transmission device includes a set of "magnetic coupling" coils which are rotatable around the tilting shaft. Accordingly, there arises no bad continuity due to electrode abrasion, mechanical vibration, and bending fatigue and no need for maintenance work (see Patent Literature 1 or the like).

CITATION LIST

Patent Literatures

SUMMARY OF THE INVENTION

Technical Problem

Herein, the conventional contactless-type power transmission device includes a set of "oppositely arranged" coils which are rotatable around the tilting shaft. Accordingly, when a space between the oppositely arranged coils is excessively narrowed, mechanical interference between the oppositely arranged coils easily occurs due to a tilting operation although magnetic coupling between the oppositely arranged coils becomes strong. On the other hand, when the space between the oppositely arranged coils is excessively widened, the magnetic coupling between the oppositely arranged coils becomes weak although the mechanical interference between the oppositely arranged coils due to the tilting operation hardly occurs.

In view of the above, when a set of "outside and inside arranged" coils rotatable around the tilting shaft is provided, it is conceivable to increase a size of an outside coil along a major-axis direction of a cross section of the outside coil (see FIG. 1). In this event, the mechanical interference between the outside and the inside arranged coils due to the tilting operation hardly occurs, but the size of the contactless-type power transmission device becomes large. The magnetic coupling between the outside and the inside arranged coils becomes weak in a tilting operation time (the "tilting operation time" means a case where the coils are in a state of being tilted from a predetermined neutral position by rotation around the tilting shaft, the same applies also in the following) as compared with a non-tilting operation time (the "non-tilting operation time" means a case where the coils are in a state of being positioned at the above-mentioned neutral position, namely, a non-tilted state, the same applies also in the following). It is therefore necessary to change a power source constant and a control constant between the tilting operation time and the non-tilting operation time so that a circuit configuration becomes complicated and large. Furthermore, depending on a condition of the circuit configuration, responsiveness upon operation switching may be decreased.

Furthermore, when a set of "parallel arranged" coils rotatable around the tilting shaft is provided, it is conceivable to increase a size of one coil along a major-axis direction of a cross section of the one coil (see FIG. 2). In this event, magnetic coupling between the parallel arranged coils is maintained even in the tilting operation time, but the size of the contactless-type power transmission device becomes large. The magnetic coupling between the parallel arranged coils becomes weak in the tilting operation time as compared with the non-tilting operation time. It is therefore necessary to change the power source constant and the control constant between the tilting operation time and the non-tilting operation time so that the circuit configuration becomes complicated and large. Furthermore, depending on the condition of the circuit configuration, the responsiveness upon operation switching may be decreased.

Accordingly, in order to resolve the above-mentioned problems, an object of this disclosure is, in a contactless-type power transmission device for performing contactless power transmission between a plurality of machinery portions accompanied with a tilting operation, to miniaturize the device, to expand a movable range of the tilting operation, and to maintain magnetic coupling between coils at a constant level independently of a tilt angle (in other words, to reduce a change in magnetic coupling between the coils depending on the tilt angle).

Solution to Problem

In order to resolve the above-mentioned problems, when a set of coils rotatable around a tilting shaft is provided, a cross section of one coil is curved along a major-axis direction of the cross section of the one coil and around, as a curvature axis, a direction parallel to a minor-axis direction of the cross section of the one coil.

Specifically, this disclosure is a coil member, including a lead wire wound in an oval shape with an oval-shaped cross section, wherein the oval-shaped cross section is curved along a major-axis direction of the oval-shaped cross section and around, as a curvature axis, a direction parallel to a minor-axis direction of the oval-shaped cross section.

According to this configuration, in either case of "outside and inside arranged" and "parallel arranged", it is possible to reduce an apparent size of the coil member (direct distance between both end portions) as compared with a conventional one even if a total length of the coil member in the major-axis direction (movable range of a tilting operation) is similar to that in the conventional one.

In addition, this disclosure is a coil member characterized in that the oval-shaped cross section is curved in a circular-arc shape or a circumferential shape as a whole.

According to this configuration, magnetic coupling between the coils becomes constant independently of a tilt angle.

Furthermore, this disclosure is a coil member characterized in that the oval-shaped cross section is partially curved and surrounds the curvature axis as a whole.

According to this configuration, the magnetic coupling between the coils becomes substantially constant independently of the tilt angle.

In addition, this disclosure is a coil member characterized in that the lead wire of the coil member is wound with stacked in multiple layers.

According to this configuration, when a frequency of power transmission is as low as on the order of kHz or when a required output of the power transmission is high, it is possible to apply the coil member which is wound in multiple layers and curved.

Furthermore, this disclosure is a coil member characterized in that the lead wire of the coil member is wound in a spiral shape of a single layer.

According to this configuration, when the frequency of the power transmission is as high as on the order of MHz or when the required output of the power transmission is low, it is possible to apply the coil member which is wound into a single layer and curved.

In addition, this disclosure is a contactless-type power transmission device, including the above-mentioned coil member as a first coil; a second coil; and a tilting variable member configured to vary a tilt between a central axis of the first coil and a central axis of the second coil with the curvature axis as a rotation axis, the central axis of the first coil being a rotational symmetry axis of the first coil.

According to this configuration, mechanical interference between the coils due to the tilting operation hardly occurs, and the contactless-type power transmission device is reduced in size. The magnetic coupling between the coils is maintained at a constant level both in a tilting operation time and in a non-tilting operation time. Therefore, it is unnecessary to change a power source constant and a control constant between the tilting operation time and the non-tilting operation time so that a circuit configuration can be simple and small. Furthermore, depending on a condition of the circuit configuration, responsiveness upon operation switching may be improved.

Furthermore, this disclosure is a contactless-type power transmission device which further includes a coil rotation member configured to rotate one of the first coil and the second coil around a central axis of the one of the first coil and the second coil as a rotation axis.

According to this configuration, the contactless-type power transmission device between a plurality of machinery portions accompanied with the tilting operation is provided with a set of coils "in combination" which are rotatable around the tilting shaft and the rotation axis. Therefore, it is possible to carry out a rotational operation in addition to the tilting operation and to miniaturize the device.

In addition, this disclosure is a contactless-type power transmission device, wherein the first coil is disposed outside whereas the second coil is disposed inside.

According to this configuration, in the con tactless-type power transmission device between the plurality of machinery portions accompanied with the tilting operation it is possible to miniaturize the device, to expand the movable range of the tilting operation, and to maintain the magnetic coupling between the outside and the inside arranged coils at a constant level independently of the tilt angle, as described above. ("to maintain the magnetic coupling between the coils at a constant level independently of the tilt angle" means to reduce a change in magnetic coupling between the coils depending on the tilt angle, the same applies also in the following)

Furthermore, this disclosure is a contactless-type power transmission device, wherein the first coil and the second coil are disposed in parallel to each other.

According to this configuration, in the contactless-type power transmission device between the plurality of machinery portions accompanied with the tilting operation, it is possible to miniaturize the device, to expand the movable range of the tilting operation, and to maintain the magnetic coupling between the parallel arranged coils at a constant level independently of the tilt angle, as described above.

In addition, this disclosure is an electromagnetic wave irradiation/reception device which includes the above-mentioned contactless-type power transmission device, characterized in that the electromagnetic wave irradiation/reception device is variable in orientation direction of irradiation and/or reception of electromagnetic waves.

According to this configuration, it is possible to apply the contactless-type power transmission device to irradiation/reception of electromagnetic waves.

Furthermore, this disclosure is a power transmission/information communication device, including the above-mentioned contactless-type power transmission device; a first coil holding member configured to hold the first coil from the outside; a second coil holding member configured to hold the second coil from the inside; a first wireless communication device disposed at a location of the first coil holding member faced to a tip of the second coil holding member when there is no tilt between the central axis of the first coil and the central axis of the second coil; and a second wireless communication device disposed at the tip of the second coil holding member.

According to this configuration, it is possible to apply the contactless-type power transmission device to power transmission/information communication.

In addition, this disclosure is an autonomous mobile robot system, including the above-mentioned power transmission/information communication device; an autonomous mobile robot device equipped with the power transmission/information communication device; a first power transmission line connected to the first coil which is magnetically coupled to the second coil, the first power transmission line being configured to perform power transmission from the power transmission/information communication device to the autonomous mobile robot device; a first information communication line connected to the first wireless communication device which carries out wireless communication with the second wireless communication device, the first information communication line being configured to carry out information communication between the power transmission/information communication device and the autonomous mobile robot device; a second power transmission line disposed along the second coil holding member and connected to the second coil, the second power transmission line being configured to perform power transmission from the outside to the power transmission/information communication device; and a second information communication line disposed along the second coil holding member and connected to the second wireless communication device, the second information communication line being configured to carry out information communication between the outside and the power transmission/information communication device.

According to this configuration, it is possible to apply the power transmission/information communication device to an autonomous mobile robot.

Advantageous Effects of Invention

As described, according to this disclosure, in a contactless-type power transmission device between a plurality of machinery portions accompanied with a tilting operation, it is possible to miniaturize the device, to expand a movable range of the tilting operation, and to maintain magnetic coupling between coils at a constant level independently of a tilt angle.

DESCRIPTION OF EMBODIMENTS

Example embodiments of this disclosure will be described with reference to attached drawings. The example embodiments, which will hereinafter be described, are examples of embodying this disclosure and this disclosure is not limited to the following example embodiments.

[Contactless-Type Power Transmission Device of Comparative Examples]

Figure 1:
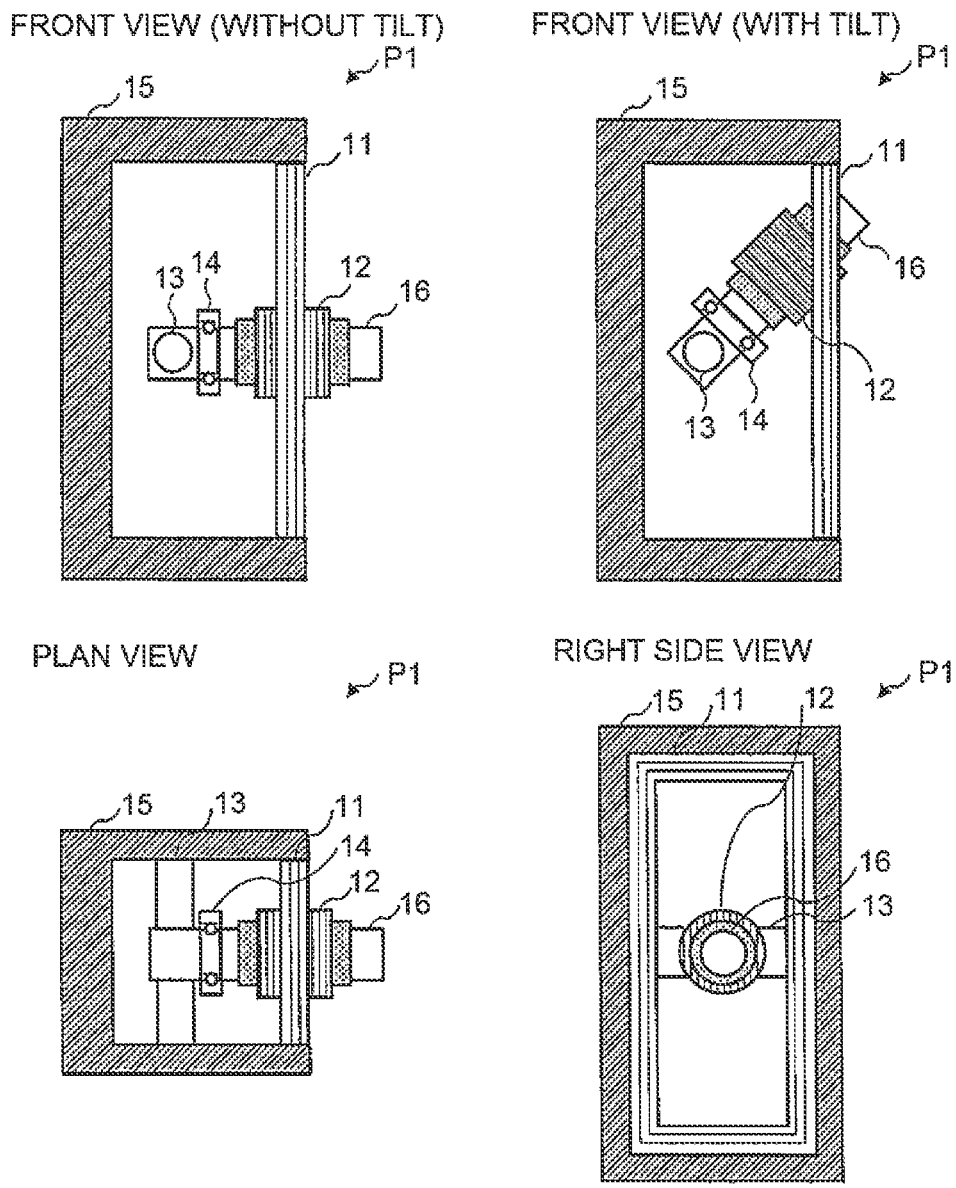
FIG. 1 includes views for illustrating a configuration of a contactless-type power transmission device of a first comparative example.
Figure 2:
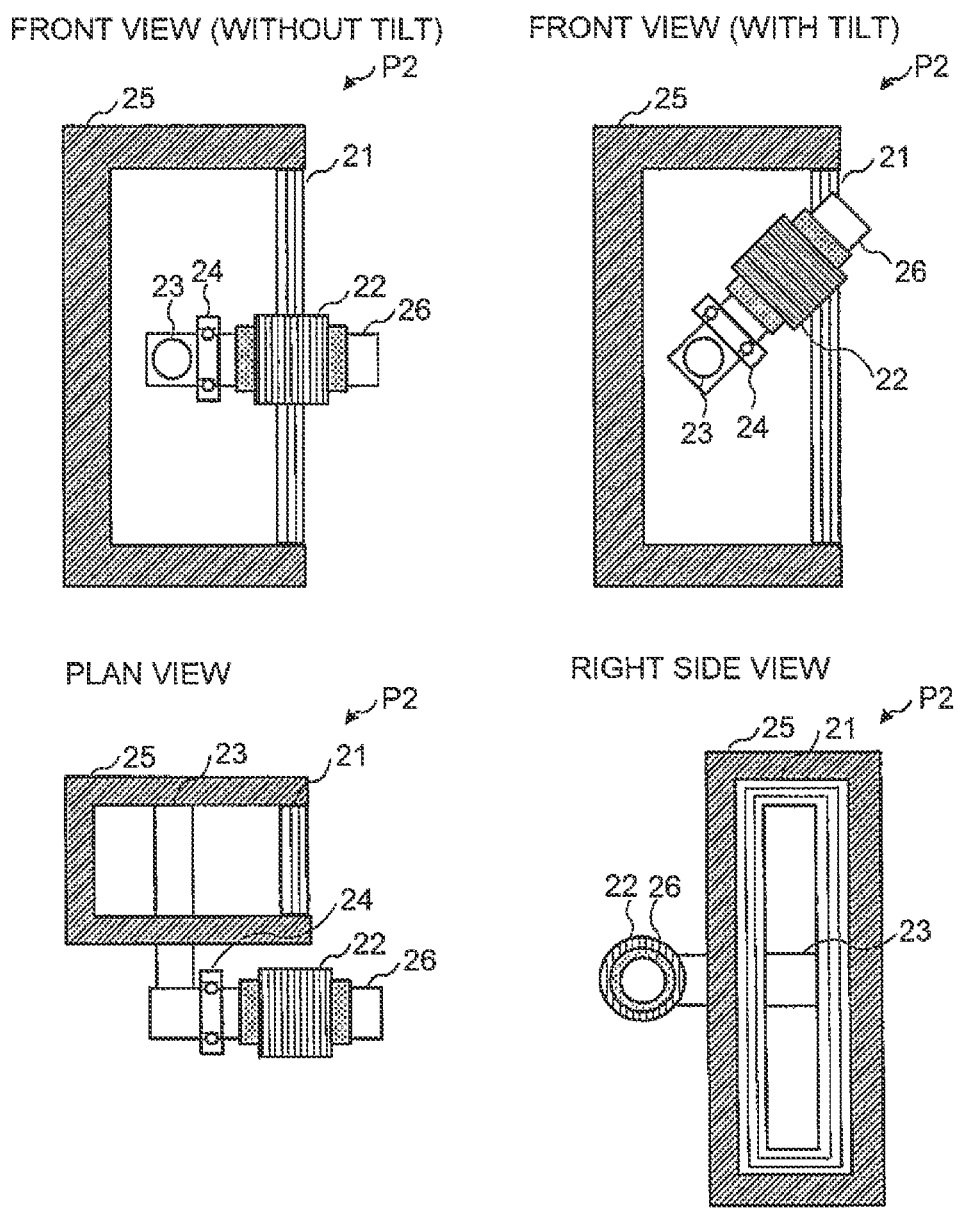
FIG. 2 includes views for illustrating a configuration of a contactless-type power transmission device of a second comparative example.

A configuration of a contactless-type power transmission device P1 of a first comparative example is illustrated in FIG. 1. A configuration of a contactless-type power transmission device P2 of a second comparative example is illustrated in FIG. 2. The contactless-type power transmission device P1 includes a first coil 11, a second coil 12, a tilting shaft 13, a bearing 14, a frame 15, and a support member 16. The contactless-type power transmission device P2 includes a first coil 21, a second coil 22, a tilting shaft 23, a bearing 24, a frame 25, and a support member 26.

Upper left fields of FIGS. 1 and 2 show front views in a state without a tilt. Upper right fields of FIGS. 1 and 2 show front views in a state with a tilt. Lower left fields of FIGS. 1 and 2 show plan views in the state without a tilt. Lower right columns of FIGS. 1 and 2 show right side views in the state without a tilt. Herein, in the front views in the upper left fields of FIGS. 1 and 2, in the front views in the upper right fields of FIGS. 1 and 2, and in the plan views of the lower left fields of FIGS. 1 and 2, the frames 15 and 25 are illustrated in cross sectional shapes whereas other members are illustrated in plane projected shapes.

The first coil 11 and the second coil 12 are disposed outside and inside, respectively. Herein, the first coil 11 and the second coil 12 are overlapped with each other at the outside and the inside when a central axis of the first coil 11 and a central axis of the second coil 12 are in parallel with each other. That is, when the central axis of the first coil 11 and the central axis of the second coil 12 are in parallel with each other, the first coil 11 and the second coil 12 are overlapped with each other as viewed in a direction perpendicular to the central axes. The first coil 21 and the second coil 22 are disposed in parallel with each other. Herein, when the central axis of the first coil 21 and the central axis of the second coil 22 are in parallel with each other, the first coil 21 and the second coil 22 are overlapped with each other as viewed from a front side of the contactless-type power transmission device P2.

The first coil 11 or 21 has an oval-shaped cross section which is perpendicular to the central axis of the first coil 11 or 21. Herein, the oval shape is a plane figure having at least one symmetry axis, such as an elongated circular shape, an elliptical shape, a circular shape, a rectangular shape, and a square shape. The second coil 12 or 22 is a cylindrical coil or the like.

The tilting shaft 13 or 23 varies a tilt between the central axis of the first coil 11 or 21 and the central axis of the second coil 12 or 22. Herein, the tilting shaft 13 or 23 is disposed so that magnetic coupling between the coils is maintained even if a tilt angle between the central axes becomes large. The bearing 14 or 24 rotates the second coil 12 or 22 around the central axis of the second coil 12 or 22 as a rotation axis. Herein, although there are two rotation axes such as the tilting shaft 13 or 23 and the bearing 14 or 24, there is only one set of coils such as the first coil 11 or 21 and the second coil 12 or 22.

The frame 15 or 25 holds the first coil 11 or 21 from the outside. Herein, the frame 15 or 25 has a structure made of a material (e.g. resin or the like) such as to never prevent the magnetic coupling between the coils. The support member 16 or 26 holds the second coil 12 or 22 from the inside. Herein, the support member 16 or 26 is a shaft member or a pipe which is made of metal or the like.

Accordingly, the second coil 12 is received inside the frame 15. The tilting shaft 13 is fixed inside the frame 15 to tilt the second coil 12, the bearing 14, and the support member 16 as a single unit. On the other hand, the second coil 22 is disposed outside the frame 25. The tilting shaft 23 is fixed inside the frame 25 and protrudes outside the frame 25 to tilt the second coil 22, the bearing 24, and the support member 26 as a single unit. An outer wall surface of the frame 15 or 25, which is in parallel with a tilting operation plane of the second coil 12 or 22, is a flat surface (see the plan views in the lower left fields in FIGS. 1 and 2 and the right side views in the lower right fields in FIGS. 1 and 2). Herein, the tilting operation plane of the second coil 12 or 22 is a virtual plane along which the central axis of the second coil 12 or 22 passes while the second coil 12 or 22 carries out the tilting operation, and is generally a flat plane which is perpendicular to an axial direction and positioned at the center of the tilting shall 13 in the axial direction.

Herein, upon providing one set of coils rotatable around the tilting shaft, it is conceivable to increase a size of the first coil 11 or 21 along a major-axis direction of the cross section of the first coil 11 or 21. In that case, although the mechanical interference between the coils due to the tilting operation hardly occurs, the size of the contactless-type power transmission device P1 or P2 becomes large. The magnetic coupling between the coils becomes weak during the tilting operation time as compared with the non-tilting operation time. Therefore, it is necessary to change a power source constant and a control constant between the tilting operation time and the non-tilting operation time so that a circuit configuration becomes complicated and large. Furthermore, depending on a condition of the circuit configuration, responsiveness upon operation switching may be decreased. Herein, the "tilting operation time" means a case where the coils are in a state of being tilted from a predetermined neutral position by rotation around the tilting shaft or the like. The "non-tilting operation time" means a case where the coils are in a state of being positioned at the above-mentioned neutral positon, namely, a non-tilted state. The same applies also in the following

[Method of Manufacturing Coil Member of this Disclosure]

Accordingly, upon providing one set of coils rotatable around the tilting shaft, it is conceivable to curve a cross section of one coil along a major-axis direction of the cross section of the one coil and around, as a curvature axis, a direction parallel to a minor-axis direction of the cross section of the one coil.

Figure 3:
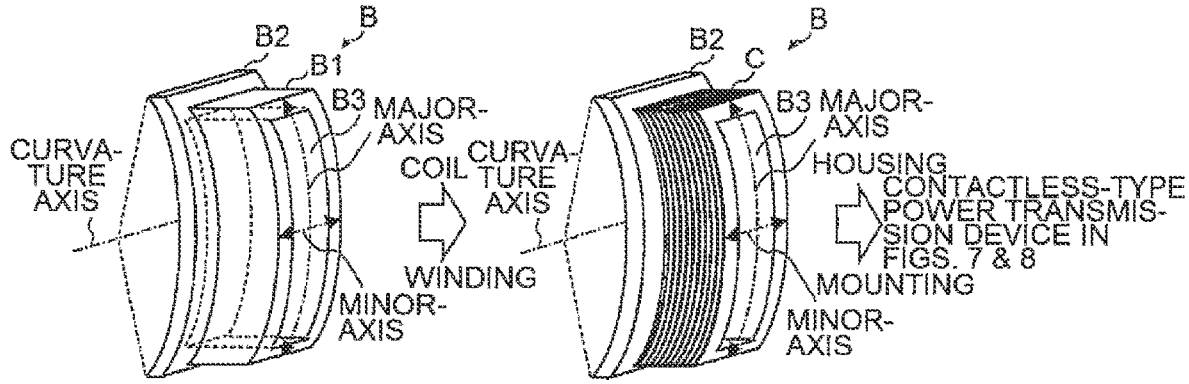
FIG. 3 includes views for illustrating a first manufacturing method of a coil member of this disclosure.
Figure 4:
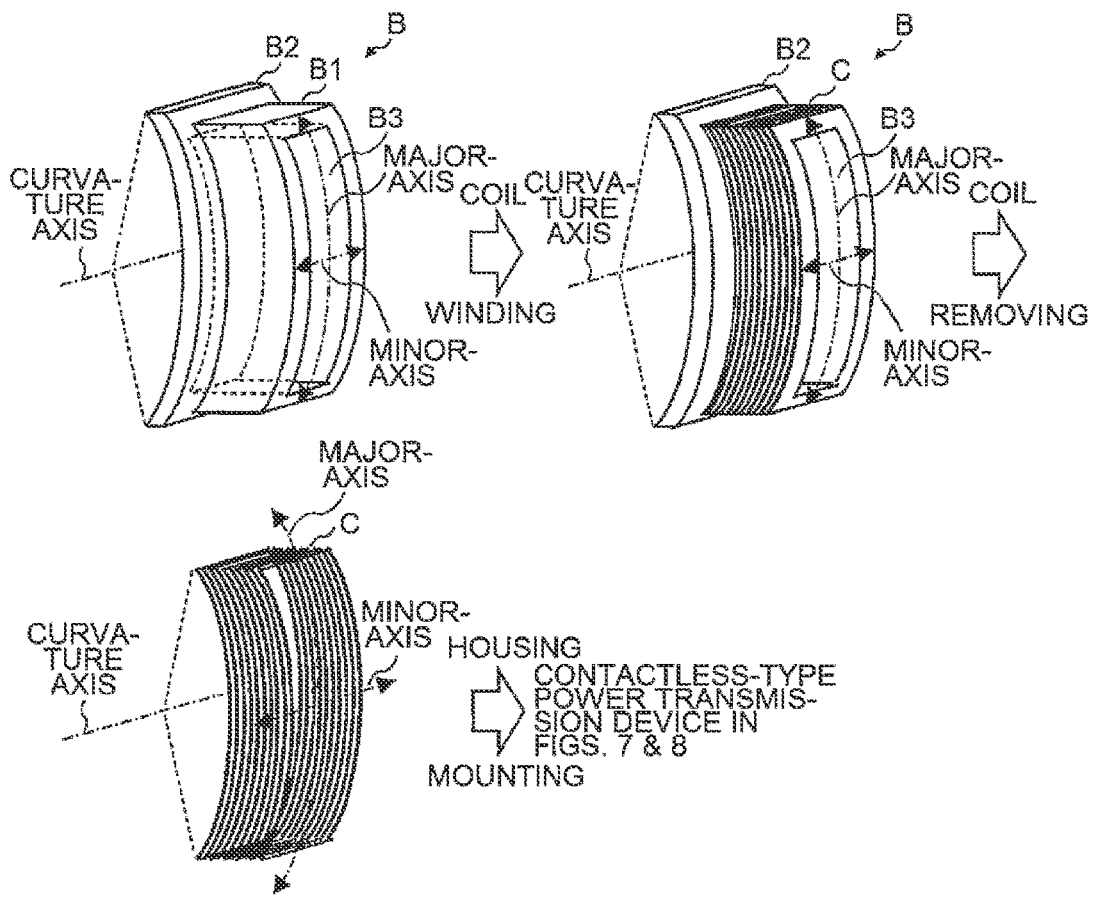
FIG. 4 includes views for illustrating a second manufacturing method of a coil member of this disclosure.
Figure 5:
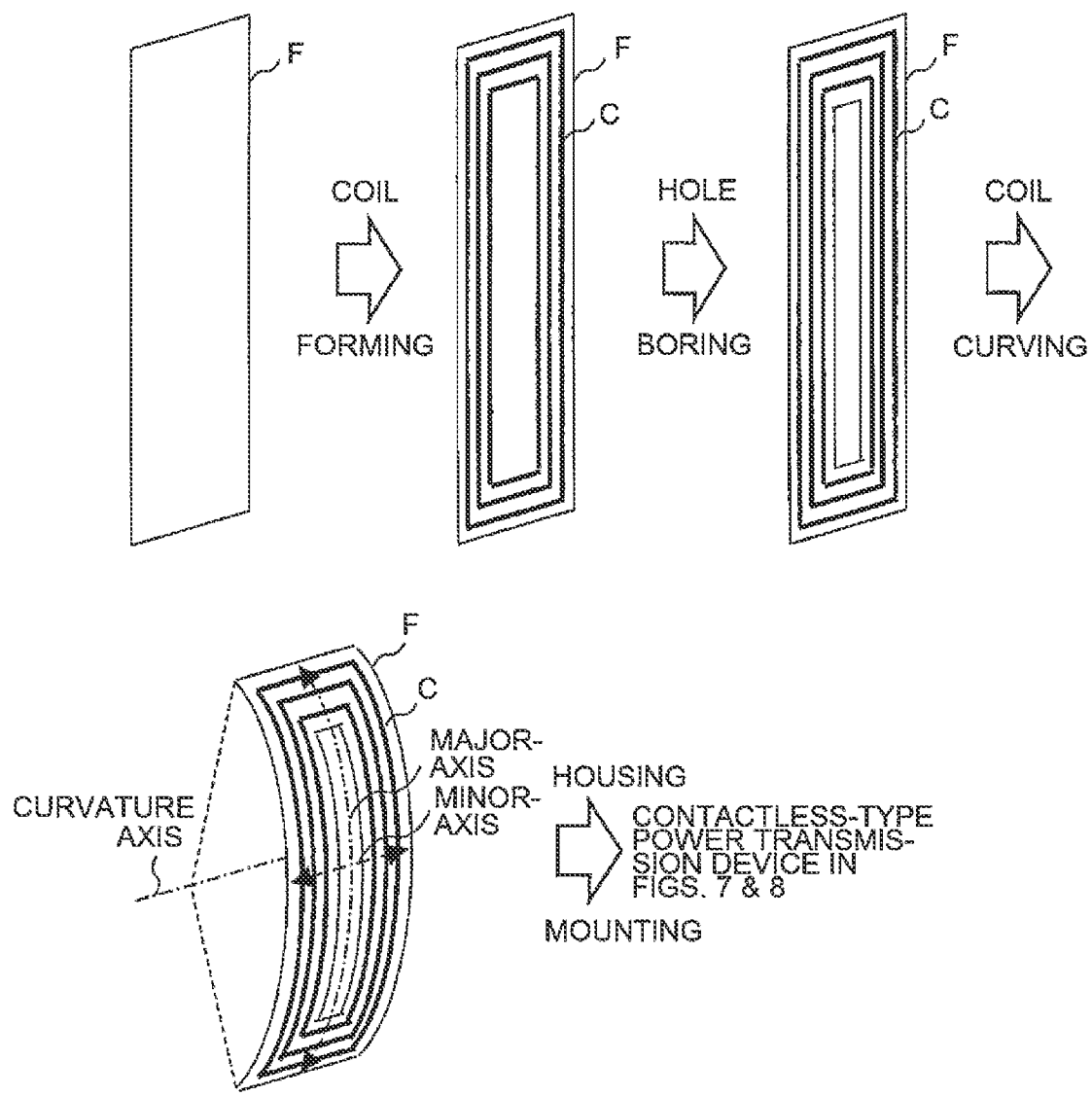
FIG. 5 includes views for illustrating a third manufacturing method of a coil member of this disclosure.

A first manufacturing method of a coil member C of this disclosure is illustrated in FIG. 3. A second manufacturing method of the coil member C of this disclosure is illustrated in FIG. 4. A third manufacturing method of the coil member C of this disclosure is illustrated in FIG. 5.

The first manufacturing method is applicable to the coil member C which is wound in multiple layers and curved, and which is suitable when a frequency of power transmission is as low as on the order of kHz or when a required output of the power transmission is high. The coil member C is manufactured using a bobbin B in the following manner.

As illustrated in FIG. 3, the bobbin B includes a winding portion B1 on which a lead wire is wound, and flange portions B2 which are provided at both ends of the winding portion B1 to lock the lead wire (in order to easily see the winding portion B1, one flange portion B2 is shown whereas another flange portion B2 is not shown). At the winding portion B1, an oval-shaped cross section is curved in a circular-arc shape as a whole along the major-axis direction of the oval-shaped cross section and around, as the curvature axis, a direction parallel to the minor-axis direction of the oval-shaped cross section. A cavity portion B3 passes through the winding portion B1 and the flange portion B2 so that a first coil 31 and a second coil 32 are disposed outside and inside, respectively, as will later be described with reference to FIG. 7.

First, the lead wire is wound on the winding portion B1 to form the coil member C. Subsequently, by using a molding member for holding the lead wire in a predetermined shape, for example, a covering material having an adhesive effect by inclusion of a tape, an adhesive agent, or a solvent or a covering material having a melting effect by application of heat, the coil member C is integrally molded. Next, in a state where the coil member C is wound on the winding portion B1, the coil member C is mounted to a frame 35 or 45, as will later be described with reference to FIG. 7 or 8.

Consequently, in the coil member C by the first manufacturing method, the lead wire is wound along the circumference of the oval shape (e.g. in the oval shape) and stacked in multiple layers. The oval-shaped cross section is curved in the circular-arc shape as a whole along the major-axis direction of the oval-shaped cross section and around, as the curvature axis, the direction parallel to the minor-axis direction of the oval-shaped cross section.

The second manufacturing method is also applicable to the coil member C which is wound in multiple layers and curved and which is suitable when a frequency of power transmission is as low as on the order of kHz or when a required output of the power transmission is high. The coil member C is manufactured using the bobbin B in the following manner.

The bobbin B includes the winding portion B1 on which the lead wire is wound, and the flange portion B2 which locks the lead wire (the flange portion B2 exists at only one of both ends in order to remove the coil member C from the winding portion B1). At the winding portion B1, the oval-shaped cross section is curved in the circular-arc shape as a whole along the major-axis direction of the oval-shaped cross section and around, as the curvature axis, the direction parallel to the minor-axis direction of the oval-shaped cross section. The cavity portion B3 passes through the winding portion B1 and the flange portion B2 so that the first coil 31 and the second coil 32 are disposed outside and inside, respectively, as will later be described with reference to FIG. 7.

First, the lead wire is wound on the winding portion B1 to form the coil member C. Subsequently, by using the covering material having the adhesive effect by inclusion of the tape, the adhesive agent, or the solvent, the covering material having the melting effect by application of heat, or the like, the coil member C is integrally molded. Next, after the coil member C is removed from the winding portion B1, the coil member C is mounted to the frame 35 or 45, as will later be described with reference to FIG. 7 or 8.

Consequently, in the coil member C by the second manufacturing method also, the lead wire is wound along the circumference of the oval shape (e.g. in the oval shape) and stacked in multiple layers. The oval-shaped cross section is curved in the circular-arc shape as a whole along the major-axis direction of the oval-shaped cross section and around, as the curvature axis, the direction parallel to the minor-axis direction of the oval-shaped cross section.

The third manufacturing method is applicable to the coil member C which is wound in a single layer and curved, and which is suitable when a frequency of power transmission is as high as on the order of MHz or when a required output of the power transmission is low. The coil member C is manufactured using a flexible board F in the following manner.

First, a lead wire of an oval shape and a spiral shape is formed on the flexible board F to form the coil member C. Subsequently, inside the coil member C, the flexible board F is subjected to hole boring. Alternatively, the flexible board F is subjected to hole boring before the coil member C is formed. Herein, the flexible board F is subjected to hole boring so as to form a hole inside the coil member C. Therefore, the first coil 31 and the second coil 32 can be arranged outside and inside, respectively, as will later be described with reference to FIG. 7. Next, the flexible board F is curved in the circular-arc shape as a whole along the major-axis direction of the oval shape of the coil member C and around, as the curvature axis, the direction parallel to the minor-axis direction of the oval shape of the coil member C. Next, the coil member C is mounted to the frame 35 or 45, as will later be described with reference to FIG. 7 or 8.

Consequently, in the coil member C by the third manufacturing method, the lead wire is wound in the spiral shape of the single layer along the circumference of the oval shape (e.g. in the oval shape). The oval-shaped cross section is curved in the circular-arc shape as a whole along the major-axis direction of the oval-shaped cross section and around, as the curvature axis, the direction parallel to the minor-axis direction of the oval-shaped cross section.

Regarding the coil member C with the lead wire wound and stacked in the multiple layers, when the coil member C is curved in the circular-arc shape as a whole after the lead wire is wound and stacked in the multiple layers, a lead wire farther from the curvature axis is elongated whereas a lead wire nearer from the curvature axis is contracted so that stress is applied to the coil member C. Accordingly, upon manufacturing the coil member C wound in the multiple layers and curved, it is desirable to apply the first and the second manufacturing methods without applying the third manufacturing method. When the frequency of power transmission is on the order of several tens to several hundreds of kHz, power loss due to a skin effect becomes large if a single wire (including a single wire of the flexible board F) is used as the lead wire of the coil member C. Therefore, a litz wire is generally used as the lead wire of the coil member C. Herein, it is difficult to achieve a multilayer structure of the flexible board F and multilayer winding of the litz wire is generally used.

Figure 6:
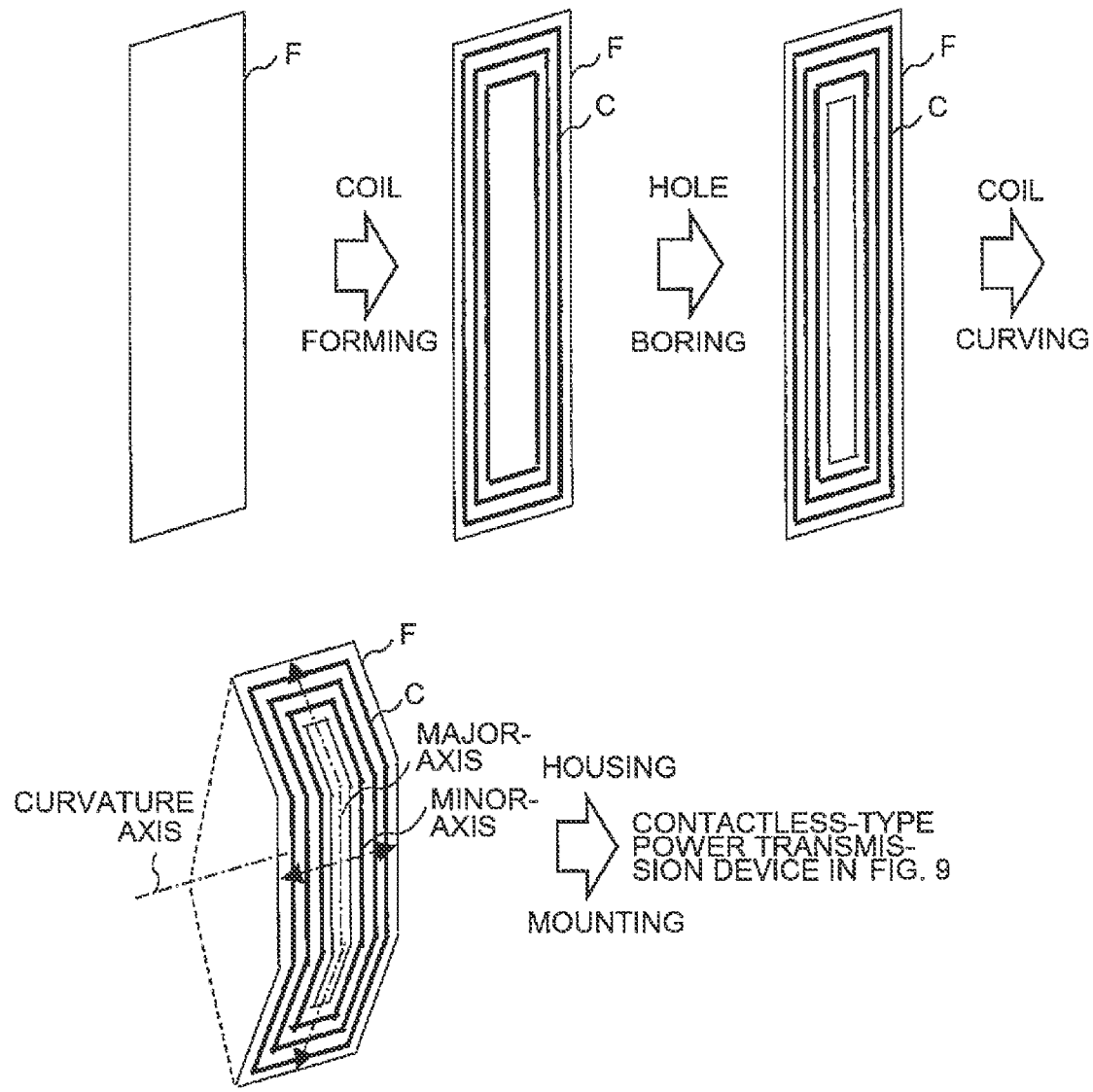
FIG. 6 includes views for illustrating a fourth manufacturing method of a coil member of this disclosure.

In the foregoing description, in the coil member C, the oval-shaped cross section is curved in the circular-arc shape as a whole along the major-axis direction of the oval-shaped cross section and around, as the curvature axis, the direction parallel to the minor-axis direction of the oval-shaped cross section. As a first modification, in the coil member C, the oval-shaped cross section may be curved in any desired shape close to the circular-arc shape as a whole along the major-axis direction of the oval-shaped cross section and around, as the curvature axis, the direction parallel to the minor-axis direction of the oval-shaped cross section. As a second modification, in the coil member C, the oval-shaped cross section may be curved in a circumferential shape close to 360° as a whole along the major-axis direction of the oval-shaped cross section and around, as the curvature axis, the direction parallel to the minor-axis direction of the oval-shaped cross section. As shown in FIG. 6, as a fourth manufacturing method, in the coil member C, the oval-shaped cross section may be partially curved (at two positions in the coil member C shown in FIG. 6) so as to surround the curvature axis as a whole along the major-axis direction of the oval-shaped cross section and around, as the curvature axis, the direction parallel to the minor-axis direction of the oval-shaped cross section.

[Contactless-Type Power Transmission Device of this Disclosure]

Figure 7:
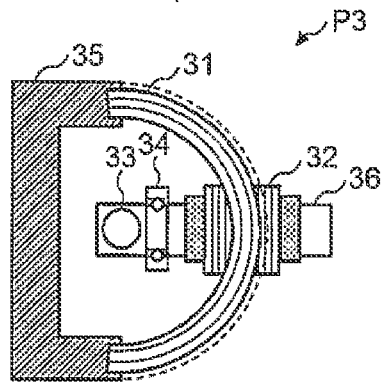
FIG. 7 includes views for illustrating a configuration of a contactless-type power transmission device of a first example embodiment.
Figure 7:
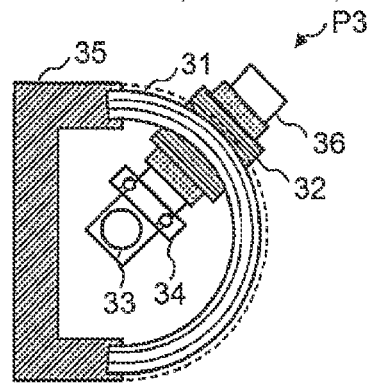
Figure 7:
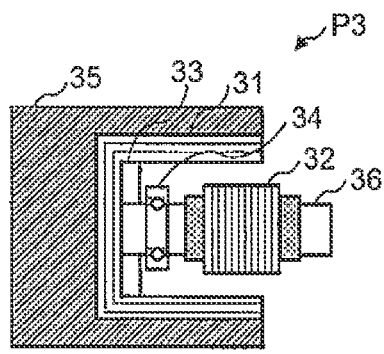
Figure 7:
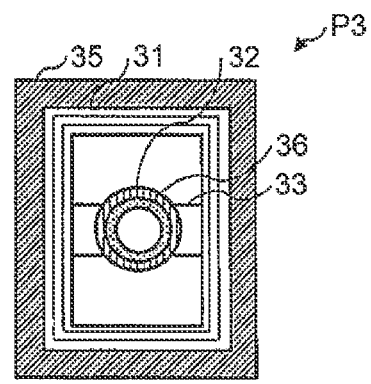
Figure 8:
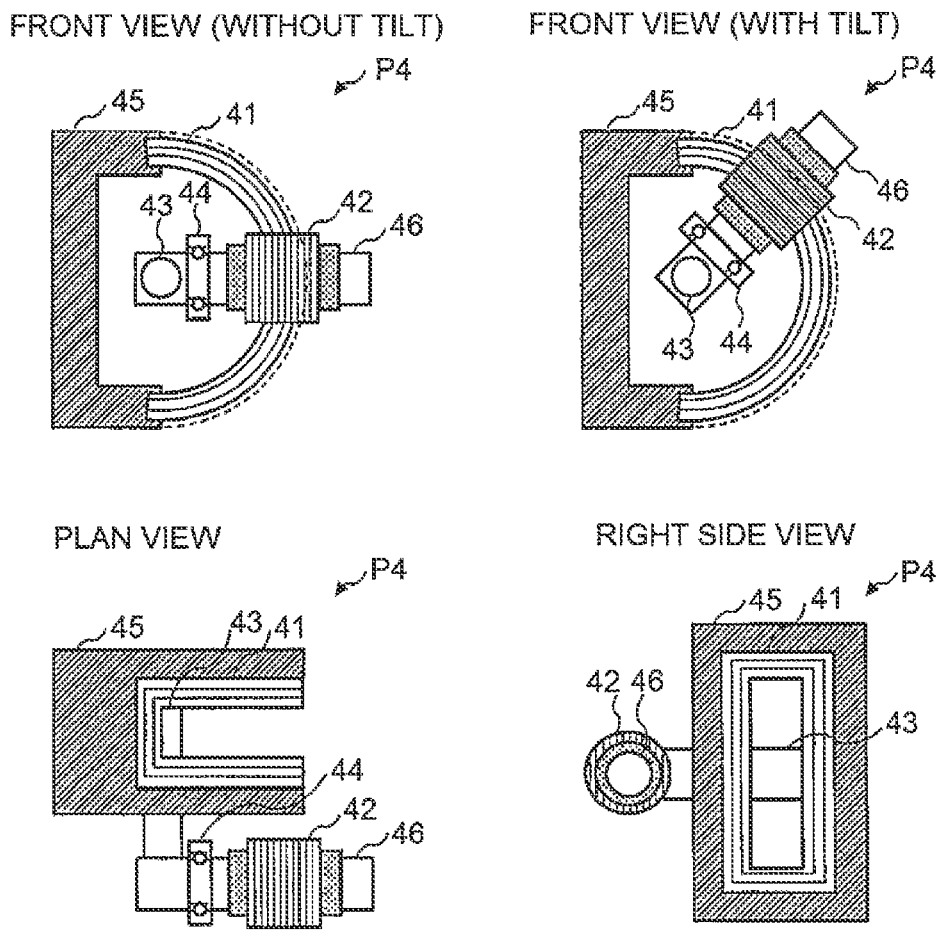
FIG. 8 includes views for illustrating a configuration of a contactless-type power transmission device of a second example embodiment.

A configuration of a contactless-type power transmission device P3 of a first example embodiment is illustrated in FIG. 7. A configuration of a contactless-type power transmission device P4 of a second example embodiment is illustrated in FIG. 8. The contactless-type power transmission device P3 includes the first coil 31, the second coil 32, a tilting shaft 33, a bearing 34, the frame 35, and a support member 36. The contactless-type power transmission device P4 includes a first coil 41, a second coil 42, a tilting shaft 43, a bearing 44, the frame 45, and a support member 46.

Upper left fields of FIGS. 7 and 8 show front views in a state without a tilt. Upper right fields of FIGS. 7 and 8 show front views in a state with a tilt. Lower left fields of FIGS. 7 and 8 show plan views in the state without a tilt. Lower right columns of FIGS. 7 and 8 show right side views in the state without a tilt. Herein, in the front views in the upper left fields of FIGS. 7 and 8, and in the front views in the upper right fields of FIGS. 7 and 8, the frame 35 is illustrated in a cross-sectional shape at a position where the second coil 32 is disposed and the frame 45 is illustrated in a cross-sectional shape within a plane including a major-axis of a cross section of the first coil 41, whereas other members are illustrated in plane projected shapes.

The first coil 31 and the second coil 32 are disposed outside and inside, respectively. Herein, the first coil 31 and the second coil 32 are overlapped with each other at the outside and the inside when a central axis of the first coil 31 (that is coaxial to a rotational symmetry axis of the first coil 31) and a central axis of the second coil 32 are in parallel with each other. That is, when the central axis of the first coil 31 and the central axis of the second coil 32 are in parallel with each other, the first coil 31 and the second coil 32 are overlapped with each other as viewed in a direction perpendicular to the central axes. The first coil 41 and the second coil 42 are disposed in parallel with each other. Herein, when the central axis of the first coil 41 (that is coaxial to a rotational symmetry axis of the first coil 41) and the central axis of the second coil 42 are in parallel with each other, the first coil 41 and the second coil 42 are overlapped with each other as viewed from a front side of the contactless-type power transmission device P4.

In the first coil 31 or 41, the oval-shaped cross section is curved in a circular-arc shape as a whole along the major-axis direction of the oval-shaped cross section and around as the curvature axis, a direction parallel to the minor-axis direction of the oval-shaped cross section. The second coil 32 or 42 is a cylindrical coil or the like.

The tilting shaft 33 or 43 varies a tilt between the central axis of the first coil 31 or 41 (that is coaxial to the rotational symmetry axis of the first coil 31 or 41) and the central axis of the second coil 32 or 42. Herein, the tilting shaft 33 or 43 is disposed to be coaxial with the above-mentioned curvature axis so that magnetic coupling between the coils is maintained even if a tilt angle between the central axes becomes large. The bearing 34 or 44 rotates the second coil 32 or 42 around the central axis of the second coil 32 or 42 as a rotation axis. Herein, although there are two rotation axes such as the tilting shaft 33 or 43 and the bearing 34 or 44, there is only one set of coils such as the first coil 31 or 41 and the second coil 32 or 42.

The frame 35 or 45 holds the first coil 31 or 41 from the outside. Herein, the frame 35 or 45 has a structure made of a material (e.g. resin or the like) such as to never prevent the magnetic coupling between the coils. The support member 36 or 46 holds the second coil 32 or 42 from the inside. Herein, the support member 36 or 46 is a shaft member or a pipe which is made of metal or the like.

Accordingly, the second coil 32 is received inside the frame 35. The tilting shaft 33 is fixed inside the frame 35 to tilt the second coil 32, the bearing 34, and the support member 36 as a single unit. On the other hand, the second coil 42 is disposed outside the frame 45. The tilting shall 43 is fixed inside the frame 45 and protrudes outside the frame 45 to tilt the second coil 42, the hearing 44, and the support member 46 as a single unit. An outer wall surface of the frame 35 or 45, which is in parallel with a tilting operation plane of the second coil 32 or 42, is a flat surface (see the plan views in the lower left fields in FIGS. 7 and 8 and the right side views in the lower right fields in FIGS. 7 and 8).

As described, in the one set of coils rotatable around the tilting shaft, the first coil 31 or 41 is disposed so that the cross section of the first coil 31 or 41 is curved along the major-axis direction of the cross section of the first coil 31 or 41 and around, as the curvature axis, the direction parallel to the minor-axis direction of the cross section of the first coil 31 or 41. Accordingly, mechanical interference between the coils due to a tilting operation hardly occurs, and the contactless-type power transmission device P3 or P4 is reduced in size. The magnetic coupling between the coils is maintained at a constant level both in a tilting operation time and in a non-tilting operation time. Therefore, it is unnecessary to change a power source constant and a control constant between the tilting operation time and the non-tilting operation time so that the circuit configuration can be simple and small. Furthermore, depending on a condition of the circuit configuration, responsiveness upon operation switching may be improved.

Figure 9:
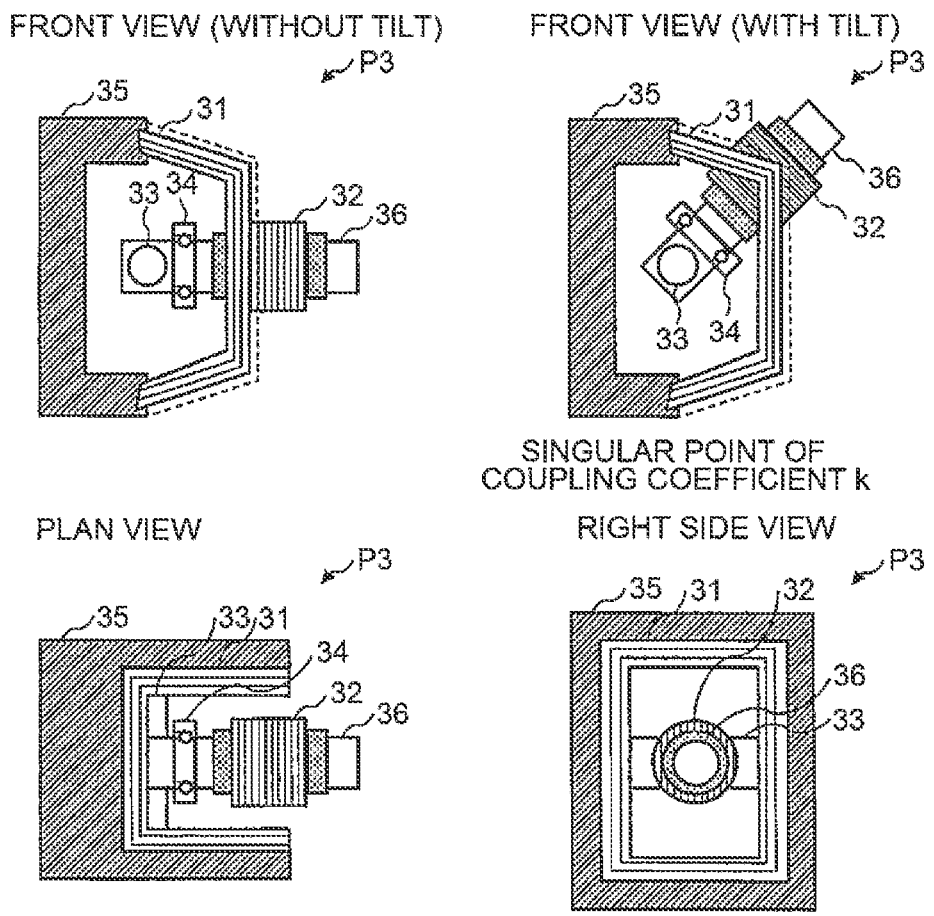
FIG. 9 includes views for illustrating a configuration of a contactless-type power transmission device of a third example embodiment.

In the foregoing description, in the first coil 31 or 41, the oval-shaped cross section is curved in the circular-arc shape as a whole along the major-axis direction of the oval-shaped cross section and around, as the curvature axis, the direction parallel to the minor-axis direction of the oval-shaped cross section. The tilting shaft 33 or 43 varies a tilt between the central axes of the first coil 31 or 41 and the central axes of the second coil 32 or 42 with the above-mentioned curvature axis as the rotation axis. As shown in FIG. 9, as a third example embodiment, in the first coil 31 (41), the oval-shaped cross section may be partially curved (at the two positions in the first coil 31 (41) shown in FIG. 9) along the major-axis direction of the oval-shaped cross section and around, as the curvature axis, the direction parallel to the minor-axis direction of the oval-shaped cross section, to surround the curvature axis as a whole. In the third example embodiment, a rotational portion such as the tilting shaft 33 (43) may vary the tilt between the central axis of the first coil 31 (41) and the central axis of the second coil 32 (42) around the above-mentioned curvature axis as the rotation axis.

In the foregoing description, the bearing 34 or 44 rotates the second coil 32 or 42 around the central axis of the second coil 32 or 42 as a rotation axis. More generally, a rotational portion such as the bearing 34 or 44 may rotate one of the first coil 31 or 41 and the second coil 32 or 42 around the central axis of the one of the first coil 31 or 41 and the second coil 32 or 42 as the rotation axis.

By disposing a magnetic substance (at positions depicted by sand areas in FIGS. 7 and 8) between the second coil 32 or 42 and the support member 36 or 46, it is possible to prevent eddy-current loss in the support member 36 or 46 even if the support member 36 or 46 is made of metal. In addition, by disposing a magnetic substance between the first coil 31 or 41 and the frame 35 or 45, it is possible to prevent eddy-current loss in the frame 35 or 45 even if the frame 35 or 45 is made of metal.

Furthermore, by disposing a magnetic substance in a gap of the first coil 41, it is possible to strengthen the magnetic coupling between the coils. Herein, in the magnetic substance disposed in the gap of the first coil 41, it is desirable that an oval-shaped cross section is curved in the circular-arc shape as a whole along the major-axis direction of the oval-shaped cross section and around, as the curvature axis, the direction parallel to the minor-axis direction of the oval-shaped cross section. This is because the magnetic coupling between the coils is maintained at a constant level both in the tilting operation time and in the non-tilting operation time.

[Coupling Coefficient of Contactless-Type Power Transmission Device]

Figure 10:
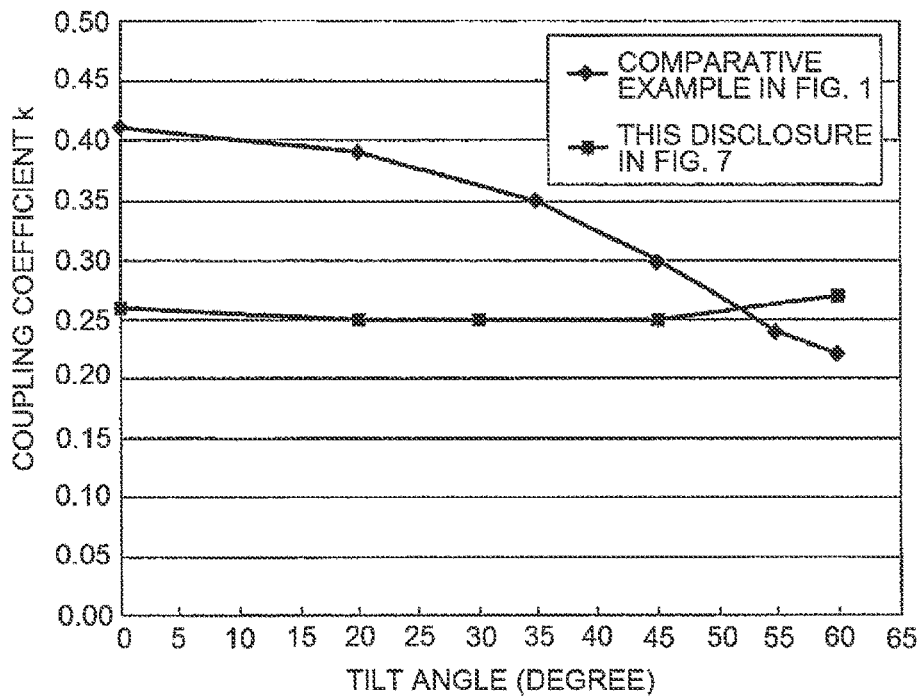
FIG. 10 is a view for illustrating coupling coefficients of the contactless-type power transmission devices of this disclosure and the comparative example.

Coupling coefficients of the contactless-type power transmission devices P1 and P3 in this disclosure and the comparative example are shown in FIG. 10. The vertical axis in FIG. 10 indicates a coupling coefficient k between the coils whereas the horizontal axis in FIG. 10 indicates a tilt angle between the coils. Herein, cross-sectional sizes of the second coils 12 and 32 are similar to each other. Apparent sizes of the first coils 11 and 31 (direct distances between both end portions) are similar to each other. Accordingly, the first coil 31 has a magnetic flux generation surface that is larger in size than a magnetic flux generation surface of the first coil 11. In the contactless-type power transmission device P1, a disposed position of the tilting shaft 13 is brought closer to the a disposed position of the first coil 11 so as to widen the tilt angle between the coils up to about ±60°.

When the tilt angle between the coils is 0 degree, in the contactless-type power transmission device P1, the coupling coefficient k between the coils is about 0.40 and is relatively large whereas in the contactless-type power transmission device P3, the coupling coefficient k between coils is about 0.25 and is relatively small. This is because, when the cross-sectional sizes of the second coils 12 and 32 are the same, the magnetic flux generation surface of the first coil 11 has a small size in the contactless-type power transmission device P1 whereas the magnetic flux generation surface of the first coil 31 has a large size in the contactless-type power transmission device P3. Herein, the coupling coefficient is determined by a ratio of that part of a magnetic flux generated by one coil which is linked in the other coil. Consequently, if the cross sectional sizes of the coils on a receiving side are similar to each other and if directions of the generated magnetic fluxes are similar to each other, the larger the size of the magnetic generation surface of the coil on a generating side becomes, the smaller the coupling coefficient becomes.

As the tilt angle between the coils becomes larger, the coupling coefficient k between the coils in the contactless-type power transmission device P1 becomes smaller from about 0.40 to about 0.20 whereas the coupling coefficient k between the coils in the contactless-type power transmission type P3 is maintained at about 0.25. This is because the direction of the magnetic flux generated by the first coil 11 in the contactless-type power transmission device P1 is not parallel to the direction of the central axis of the second coil 12 whereas the direction of the magnetic flux generated by the first coil 31 in the contactless-type power transmission device P3 is kept oriented in the direction of a curvature diameter of the first coil 31. As described above, what is important in circuit design is smallness in a change in coupling coefficient between the coils due to a change in tilt angle between the coils, rather than largeness of the coupling coefficient between the coils. In this sense, it is desirable to adopt the contactless-type power transmission device P3 rather than to adopt the contactless-type power transmission device P1.

In the contactless-type power transmission device P3, when the oval-shaped cross section partially curved is adopted, a singular point occurs in the coupling coefficient between the coils in correspondence to a partially curved position of the oval-shaped cross section (when the tilt angle between the coils is about ±45° in FIG. 9). In the contactless-type power transmission device P3, when the disposed position of the second coil 32 comes closer to a neighborhood of the end of the first coil 31, a distance between the coils becomes short as compared with a case when the disposed position of the second coil 32 is not close to the neighborhood of the end of the first coil 31. Therefore, the coupling coefficient between the coils increases.

Figure 11:
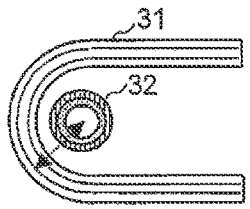
FIG. 11 includes views for illustrating relationships between an end shape of the coil member of this disclosure and the coupling coefficients between coils.
Figure 11:
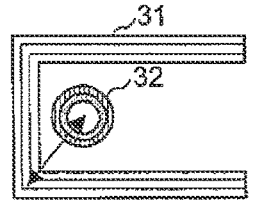
Figure 11:
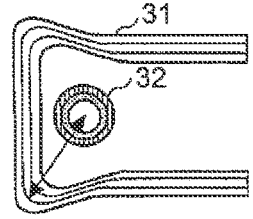
Figure 11:
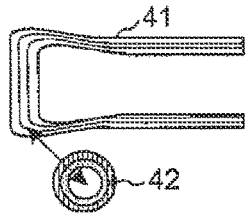
Figure 11:
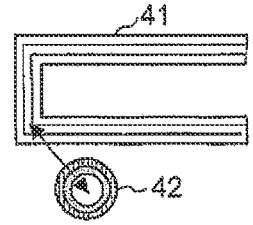
Figure 11:
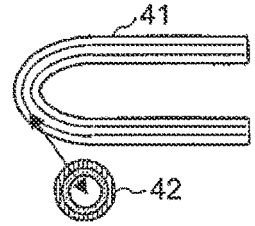

FIG. 11 shows relationships between end shapes of the coil member of this disclosure and the coupling coefficients between the coils. A left field in FIG. 11 shows cases where the coupling coefficient between the coils increases in a wide range, a middle field in FIG. 11 shows cases where the coupling coefficient between the coils increases in a medium range, and a right field in FIG. 11 shows cases where the coupling coefficient between the coils increases in a small range. An upper field in FIG. 11 shows positional relationships between the first coil 31 and the second coil 32 whereas a lower field in FIG. 11 shows positional relationships between the first coil 41 and the second coil 42.

In a case where the end of the first coil 31 has a circular-arc shape, when the disposed position of the second coil 32 becomes closer to the neighborhood of the end of the first coil 31, the distance between the first coil 31 and the second coil 32 becomes short and the coupling coefficient between the coils increases in a wide range. In a case where the end of the first coil 41 has a bulged shape, when the disposed position of the second coil 42 becomes closer to the neighborhood of the end of the first coil 41, the distance between the first coil 41 and the second coil 42 becomes short and the coupling coefficient between the coils increases in a wide range.

In a case where the end of the first coil 31 has a square shape, when the disposed position of the second coil 32 becomes closer to the neighborhood of the end of the first coil 31, the distance between the first coil 31 and the second coil 32 becomes medium and the coupling coefficient between the coils increases in a medium range. In a case where the end of the first coil 41 has a square shape, when the disposed position of the second coil 42 becomes closer to the neighborhood of the end of the first coil 41, the distance between the first coil 41 and the second coil 42 becomes medium and the coupling coefficient between the coils increases in a medium range.

In a case where the end of the first coil 31 has a bulged shape, when the disposed position of the second coil 32 becomes closer to the neighborhood of the end of the first coil 31, the distance between the first coil 31 and the second coil 32 becomes large and the coupling coefficient between the coils increases in a small range. In a case where the end of the first coil 41 has a circular-arc shape, when the disposed position of the second coil 42 becomes closer to the neighborhood of the end of the first coil 41, the distance between the first coil 41 and the second coil 42 becomes large and the coupling coefficient between the coils increases in a small range.

[Electromagnetic Wave Irradiation/Reception Device of this Disclosure]

Figure 12:
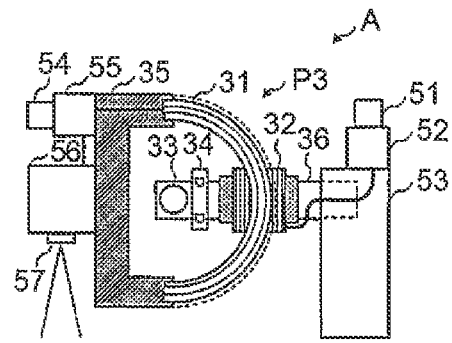
FIG. 12 includes views for illustrating a configuration of an electromagnetic wave irradiation/reception device of a fourth example embodiment.
Figure 12:
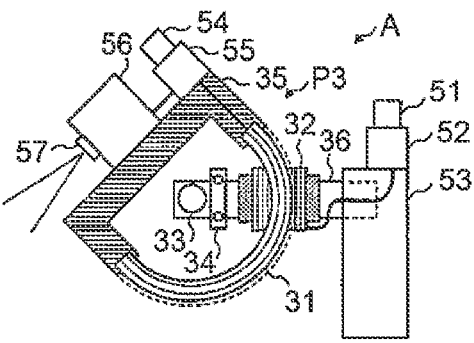

A configuration of an electromagnetic wave irradiation/reception device A of a fourth example embodiment is illustrated in FIG. 12. The electromagnetic wave irradiation/reception device A includes the contactless-type power transmission device P3, a power transmission control device 51, a power transmission power source 52, a fixing member 53, a power reception control device 54, a power reception power source 55, an irradiation/reception instrument 56, and an irradiation/reception member 57.

A left field in FIG. 12 shows a front view in a state without a tilt. A right field in FIG. 12 shows a front view in a state with a tilt. Herein, in the front view in the left field in FIG. 12 and in the front view in the right field in FIG. 12, the frame 35 is illustrated in the cross-sectional shape at the disposed position of the second coil 32 whereas other members are illustrated in plane projected shapes.

The power transmission control device 51 controls the power transmission power source 52 and is equipped with a radio device for operation control and data transmission. The power transmission power source 52 transmits electric power to the second coil 32. The fixing member 53 fixes the support member 36 and is equipped with the power transmission control device 51 and the power transmission power source 52.

The power reception control device 54 controls the power reception power source 55 and is equipped with a radio device for operation control and data transmission. The power reception power source 55 is fixed to the frame 35 and receives electric power from the first coil 31. The irradiation/reception instrument 56 is fixed to the frame 35 and controls the irradiation/reception member 57. The irradiation/reception member 57 radiates and/or receives electromagnetic waves.

Herein, the electromagnetic wave irradiation/reception device A is a lighting device, a camera device, an infrared sensor device, an X ray analysis device, a radar device, or the like. The irradiation/reception member 57 is a light source, a lens, an infrared sensor, an X ray light source/sensor, a transmission/reception antenna, or the like.

Furthermore, a motor for the tilting shaft 33 is supplied with electric power from the power reception power source 55 and is controlled by the power reception control device 54. A motor for the bearing 34 is supplied with electric power from the power transmission power source 52 and is controlled by the power transmission control device 51. Therefore, it is possible to achieve an operation of the reception side device independently of the transmission side device via wireless connection, that is a mission of the contactless-type power transmission device P3.

In the fourth example embodiment, the electromagnetic wave irradiation/reception device A includes the contactless-type power transmission device P3. However, as another modification, the electromagnetic wave irradiation/reception device A may include the contactless-type power transmission device P4.

[Power Transmission/Information Communication Device of this Disclosure]

Figure 13:
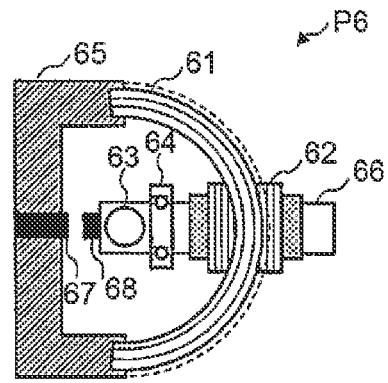
FIG. 13 includes views for illustrating a configuration of a power transmission/information communication device of a fifth example embodiment.
Figure 13:
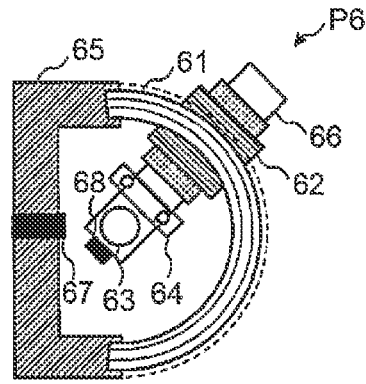
Figure 13:
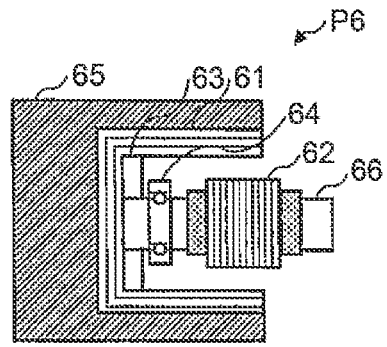
Figure 13:
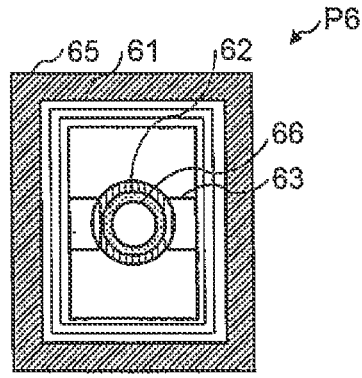
Figure 14:
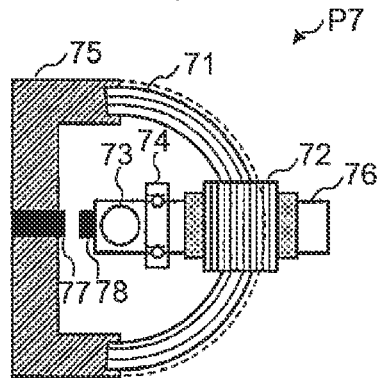
FIG. 14 includes views for illustrating a configuration of a power transmission/information communication device of a sixth example embodiment.
Figure 14:
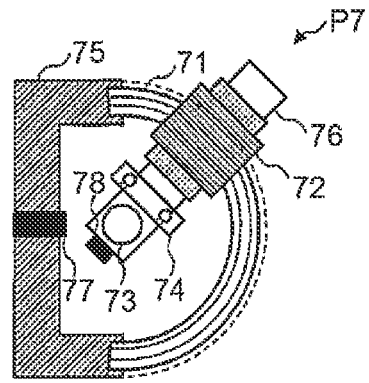
Figure 14:
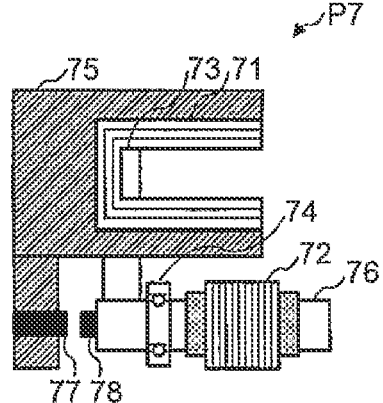
Figure 14:
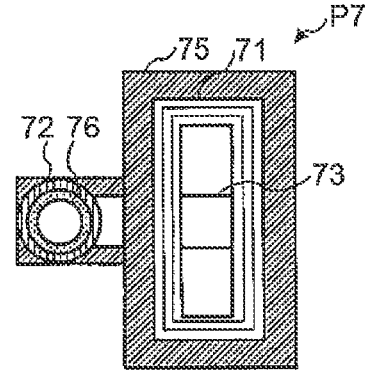

A configuration of a power transmission/information communication device P6 of a fifth example embodiment is illustrated in FIG. 13. A configuration of a power transmission/information communication device P7 of a sixth example embodiment is illustrated in FIG. 14. The power transmission/information communication device P6 includes a first coil 61, a second coil 62, a tilting shaft 63, a bearing 64, a frame 65, a support member 66, a first wireless communication device 67, and a second wireless communication device 68. The power transmission/information communication device P7 includes a first coil 71, a second coil 72, a tilting shaft 73, a bearing 74, a frame 75, a support member 76, a first wireless communication device 77, and a second wireless communication device 78.

Upper left fields in FIGS. 13 and 14 show front views in a state without a tilt. Upper right fields in FIGS. 13 and 14 show front views in a state with a tilt. Lower left fields in FIGS. 13 and 14 show plan views in the state without a tilt. Lower right columns in FIGS. 13 and 14 show right side views in the state without a tilt. Herein, in the front views in the upper left fields in FIGS. 13 and 14 and in the front views in the upper right fields in FIGS. 13 and 14, the frame 65 is illustrated in a cross-sectional shape at a disposed position of the second coil 62 and the frame 75 is illustrated in a cross-sectional shape in a plane including a major-axis of a cross section of the first coil 71, whereas other members are illustrated in plane projected shapes. However, in the front view in the upper left field in FIG. 14 and in the front view in the upper right field in FIG. 14, the first wireless communication device 77 is shown in order to easily see facing of the first wireless communication device 77 and the second wireless communication device 78.

The first coil 61, the second coil 62, the tilting shaft 63, the bearing 64, the frame 65, and the support member 66 are similar to the first coil 31, the second coil 32, the tilting shaft 33, the bearing 34, the frame 35, and the support member 36, respectively. The first coil 71, the second coil 72, the tilting shaft 73, the bearing 74, the frame 75, and the support member 76 are similar to the first coil 41, the second coil 42, the tilting shaft 43, the bearing 44, the frame 45, and the support member 46, respectively.

The first wireless communication device 67 or 77 is disposed at a position of the frame 65 or 75 which is faced to a tip of the support member 66 or 76 when there is no tilt between the central axis of the first coil 61 or 71 and the central axis of the second coil 62 or 72. The second wireless communication device 68 or 78 is disposed at the tip of the support member 66 or 76. The first wireless communication device 67 and the second wireless communication device 68 are faced to each other in the interior of the frame 65 that receives the first coil 61 therein. The first wireless communication device 77 and the second wireless communication device 78 are faced to each other at a portion of the frame 75 that projects on the side of the second coil 72.

Each of the first wireless communication devices 67 and 77 and the second wireless communication devices 68 and 78 may be (1) an antenna for carrying out wireless communication with a radio wave or may be (2) an LED, an LD, and a PD (furthermore, peripheral lens members thereof) for carrying out wireless communication with infrared rays or visible light.

Thus, by using the contactless-type power transmission device P3 or P4, it is possible to achieve fusion of the power transmission and the information communication in the power transmission/information communication device P6 or P7.

Herein, the tip of the support member 66 or 76 and the above-mentioned position of the frame 65 or 75 are connected to each other by the first wireless communication device 67 or 77 and the second wireless communication device 68 or 78. Consequently, mobile ranges of a rotational operation and a tilting operation of the power transmission/information communication device P6 or P7 are not limited due to problems of twisting, bending, and breaking of a wired cable.

[Autonomous Mobile Robot System of this Disclosure]

Figure 15:
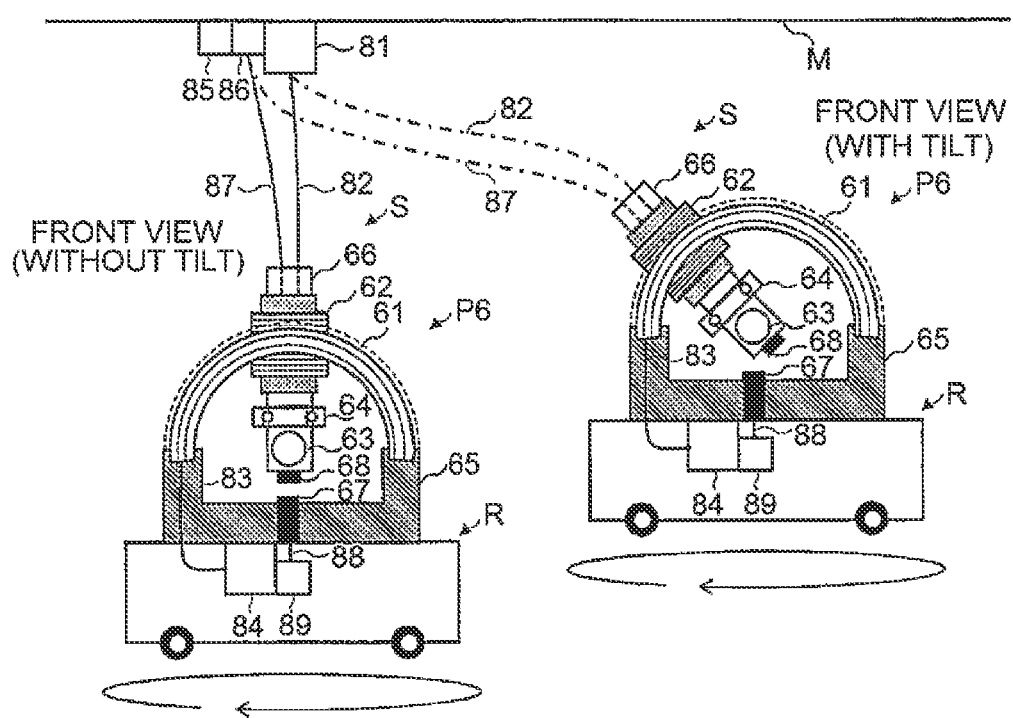
FIG. 15 includes views for illustrating a configuration of an autonomous mobile robot system of a seventh example embodiment.

A configuration of an autonomous mobile robot system S of a seventh example embodiment is illustrated in FIG. 15. The autonomous mobile robot system S includes the power transmission/information communication device P6, an autonomous mobile robot device R, a power transmission power source 81, a second power transmission line 82, a first power transmission line 83, an information processing terminal 85, a power transmission control device 86, and a second information communication line 87. The autonomous mobile robot device R includes a power reception power source 84, a first information communication line 88, and a power reception control device 89.

The autonomous mobile robot device R is equipped with the power transmission/information communication device P6. For instance, the autonomous mobile robot device R is exemplified by an autonomous walking robot device, an article transfer robot device, a drone device, an underwater exploration robot device, or the like.

The second power transmission line 82 is disposed along the support member 66, is connected to the second coil 62, and carries out power transmission from the power transmission power source 81 to the power transmission/information communication device P6. For instance, the second power transmission line 82 is exemplified by a high power cable having a large diameter or the like.

The second information communication line 87 is disposed along the support member 66, is connected to the second wireless communication device 68, and carries out information communication between the information processing terminal 85 and the power transmission control device 86 and the power transmission/information communication device P6. For instance, the second information communication line 87 is exemplified by a high-capacity coaxial cable, an optical fiber cable, or the like.

The first power transmission line 83 is connected to the first coil 61 magnetically coupled to the second coil 62, and carries out power transmission from the power transmission/information communication device P6 to the power reception power source 84 of the autonomous mobile robot device R. Herein, the first power transmission line 83 never causes twisting and bending due to the rotational operation and the tilting operation of the power transmission/information communication device P6.

The first information communication line 88 is connected to the first wireless communication device 67 for carrying out wireless communication with the second wireless communication device 68 and carries out information communication between the power transmission/information communication device P6 and the power reception control device 89 of the autonomous mobile robot device R. Herein, the first information communication line 88 never causes twisting and bending due to the rotational operation and the tilting operation of the power transmission/information communication device P6.

Thus, by using the power transmission/information communication device P6, it is possible to operate the autonomous mobile robot device R in the autonomous mobile robot system S.

Herein, the power transmission power source 81 and the power transmission/information communication device P6 are connected via the second power transmission line 82 disposed along the support member 66, and the support member 66 carries out the rotational operation and the tilting operation relative to the frame 65. Accordingly, even if it is necessary to carry out high-power transmission to the autonomous mobile robot device R and a long-time continuous operation without a battery, a mobile range of the autonomous mobile robot device R is less limited due to problems of twisting, bending, and breaking of the second power transmission line 82.

Then, the information processing terminal 85 and the power transmission control device 86 and the power transmission/information communication device P6 are connected via the second information communication line 87 disposed along the support member 66, and the support member 66 carries out the rotational operation and the tilting operation relative to the frame 65. Accordingly, even if it is necessary to carry out large-capacity communication with the autonomous mobile robot device R and real-time communication, the mobile range of the autonomous mobile robot device R is less limited due to problems of twisting, bending, and breaking of the second information communication line 87.

In the seventh example embodiment, the autonomous mobile robot system S includes the power transmission/information communication device P6. However, as another modification, the autonomous mobile robot system S may include the power transmission/information communication device P7.

In addition, in the seventh example embodiment, the power transmission power source 81, the information processing terminal 85, and the power transmission control device 86 are fixed to a fixing member M such as a ceiling, a wall, a floor, or another device. However, as another modification, a power source plug and the information processing terminal 85 may be disposed at the fixing member M such as the ceiling, the wall, the floor, or another device whereas the power transmission power source 81 and the power transmission control device 86 may be fixed to the support member 66 of the power transmission/information communication device P6 or another member fixed to the support member 66.

While the description has been made about the example embodiments of the present invention and the modifications thereof, the present invention is not limited thereto. For instance, the present invention includes a mode obtained by suitably combining a part or a whole of the example embodiments and the modifications described above and a mode obtained by suitably changing the above-mentioned mode.

INDUSTRIAL APPLICABILITY

The coil members of this disclosure are applicable to the contactless-type power transmission devices, the electromagnetic wave irradiation/reception device, the power transmission/information communication devices, and the autonomous mobile robot system of this disclosure and so on. The contactless-type power transmission devices of this disclosure are applicable to connectors, robots, optical instruments, radars, and so on. The electromagnetic wave irradiation/reception device of this disclosure is applicable to optical instruments, radars, and so on. The power transmission/information communication devices of this disclosure are applicable to robots, optical instruments, radars, and so on. The autonomous mobile robot system of this disclosure is applicable to various types of robots.

REFERENCE SIGNS LIST

P1, P2, P3, P4: contactless-type power transmission device
B: bobbin
B1: winding portion
B2: flange portion
B3: cavity portion
C: coil member
F: flexible board
A: electromagnetic wave irradiation/reception device
P6, P7 power transmission/information communication device
S: autonomous mobile robot system
R: autonomous mobile robot device
M: fixing member
11, 21, 31, 41, 61, 71: first coil
12, 22, 32, 42, 62, 72: second coil
13, 23, 33, 43, 63, 73: tilting shaft
14, 24, 34, 44, 64, 74: bearing
15, 25, 35, 45, 65, 75: frame
16, 26, 36, 46, 66, 76: support member
51: power transmission control device
52: power transmission power source
53: fixing member
54: power reception control device
55: power reception power source
56: irradiation/reception instrument
57: irradiation/reception member
67, 77: first wireless communication device
68, 78: second wireless communication device
81: power transmission power source
82: second power transmission line
83: first power transmission line
84: power reception power source
85: information processing terminal
86: power transmission control device
87: second information communication line
88: first information communication line
89: power reception control device.

The invention claimed is:

1. A contactless-type power transmission device, comprising:
a first coil including a lead wire wound in an oval shape with an oval-shaped cross section which is perpendicular to a first central axis of the first coil, the first central axis of the first coil being a rotational symmetry axis of the first coil,
wherein the oval-shaped cross section is curved along a major-axis direction of the oval-shaped cross section and around, as a curvature axis, a direction parallel to a minor-axis direction of the oval-shaped cross section;
a second coil which is a cylindrical coil;
a second coil holding member configured to hold the second coil from the inside;
a tilting variable member configured to tilt the second coil and the second coil holding member as a single unit so as to vary a tilt between the first central axis of the first coil and a second central axis of the second coil with the curvature axis as a rotation axis.

2. The contactless-type power transmission device as claimed in claim 1, wherein the oval-shaped cross section is curved in a circular-arc shape or a circumferential shape as a whole.

3. The contactless-type power transmission device as claimed in claim 1, wherein the oval-shaped cross section is partially curved and surrounds the curvature axis as a whole.

4. The contactless-type power transmission device as claimed in claim 1, wherein the lead wire of the first coil is wound and stacked in multiple layers.

5. The contactless-type power transmission device as claimed in claim 1, wherein the lead wire of the first coil is wound in a spiral shape of a single layer.

6. The contactless-type power transmission device as claimed in claim 1, wherein electrical power is supplied to the second coil.

7. The contactless-type power transmission device as claimed in claim 6, wherein the contactless-type power transmission device further comprises:
   a coil rotation member configured to rotate one of the first coil and the second coil around a central axis of the one of the first central axis of the first coil and the second central axis of the second coil as a rotation axis.

8. The contactless-type power transmission device as claimed in claim 6,
   wherein the first coil is disposed outside whereas the second coil is disposed inside.

9. The contactless-type power transmission device as claimed in claim 6, wherein the first coil and the second coil are disposed in parallel to each other.

10. An electromagnetic wave irradiation/reception device, comprising:
    the contactless-type power transmission device claimed in claim 6,
    wherein the electromagnetic wave irradiation/reception device is variable in orientation direction of irradiation and/or reception of electromagnetic waves.

11. A power transmission/information communication device, comprising:
    the contactless-type power transmission device claimed in claim 6;
    a first coil holding member configured to hold the first coil from the outside;
    a first wireless communication device disposed at a location of the first coil holding member faced to a tip of the second coil holding member when there is no tilt between the first central axis of the first coil and the second central axis of the second coil; and
    a second wireless communication device disposed at the tip of the second coil holding member.

12. An autonomous mobile robot system, comprising:
    the power transmission/information communication device claimed in claim 11;
    an autonomous mobile robot device equipped with the power transmission/information communication device;
    a first power transmission line connected to the first coil which is magnetically coupled to the second coil, the first power transmission line being configured to perform power transmission from the power transmission/information communication device to the autonomous mobile robot device;
    a first information communication line connected to the first wireless communication device which carries out wireless communication with the second wireless communication device, the first information communication line being configured to carry out information communication between the power transmission/information communication device and the autonomous mobile robot device;
    a second power transmission line disposed along the second coil holding member and connected to the second coil, the second power transmission line being configured to perform power transmission from the outside to the power transmission/information communication device; and
    a second information communication line disposed along the second coil holding member and connected to the second wireless communication device, the second information communication line being configured to carry out information communication between the outside and the power transmission/information communication device.

* * * * *